United States Patent
Kim

(10) Patent No.: US 9,946,442 B2
(45) Date of Patent: Apr. 17, 2018

(54) METHOD, APPARATUS, AND COMPUTER PROGRAM FOR PROVIDING SUB-CONTENT WHILE PROVIDING ONLINE CONTENT

(71) Applicant: NAVER CORPORATION, Seongnam-si (KR)

(72) Inventor: Sung Min Kim, Seongnam-si (KR)

(73) Assignee: NAVER Corporation, Seongnam-si (KR)

(*) Notice: Subject to any disclaimer, the term of this patent is extended or adjusted under 35 U.S.C. 154(b) by 350 days.

(21) Appl. No.: 14/711,390

(22) Filed: May 13, 2015

(65) Prior Publication Data
US 2015/0332352 A1 Nov. 19, 2015

(30) Foreign Application Priority Data
May 13, 2014 (KR) .................. 10-2014-0057124

(51) Int. Cl.
| | | |
|---|---|---|
| G06Q 30/00 | (2012.01) |
| G06F 3/0484 | (2013.01) |
| G06Q 30/02 | (2012.01) |
| G06F 17/30 | (2006.01) |
| H04L 29/06 | (2006.01) |

(52) U.S. Cl.
CPC ........ *G06F 3/0484* (2013.01); *G06F 3/04842* (2013.01); *G06F 3/04847* (2013.01); *G06F 17/30* (2013.01); *G06F 17/30905* (2013.01); *G06Q 30/02* (2013.01); *G06Q 30/0277* (2013.01); *H04L 29/06* (2013.01); *H04L 65/1083* (2013.01); *H04L 65/605* (2013.01)

(58) Field of Classification Search
CPC ............................ G06F 3/0484; G06F 3/04842
USPC .......................................................... 705/14.73
See application file for complete search history.

(56) References Cited

U.S. PATENT DOCUMENTS

2014/0006167 A1* 1/2014 Korn .................. G06Q 30/0267
                                                                       705/14.64
2015/0163559 A1* 6/2015 Manchester ......... H04N 21/812
                                                                       725/34

FOREIGN PATENT DOCUMENTS

| JP | 2012151875 A * | 8/2012 | ......... H04N 5/44543 |
| KR | 10-2007-0055890 | 5/2007 |
| KR | 10-2008-0011364 | 2/2008 |
| KR | 10-2011-0023615 | 3/2011 |
| KR | 10-1256932 | 4/2013 |

OTHER PUBLICATIONS

• Thales S. Teixeira. When People Pay Attention to Video Ads and Why. (Oct. 14, 2015). Retrieved online Jan. 16, 2017. https://hbr.org/2015/10/when-people-pay-attention-to-video-ads-and-why.*
Office Action issued by the Korean Patent Office dated Sep. 25, 2015.

* cited by examiner

*Primary Examiner* — James A Reagan
(74) *Attorney, Agent, or Firm* — Greer Burns & Crain Ltd.

(57) ABSTRACT

Disclosed herein is a method, apparatus, and computer program for providing sub-content while providing online content. The method, apparatus, and computer program for providing sub-content while providing online content provides predetermined sub-content before providing online main content to a user, displays a predetermined user interface after a certain period of time, and continuously provides the sub-content only when the user selects the user interface.

10 Claims, 9 Drawing Sheets

METHOD, APPARATUS, AND COMPUTER PROGRAM FOR PROVIDING SUB-CONTENT WHILE PROVIDING ONLINE CONTENT

BACKGROUND OF THE INVENTION

1. Field of the Invention

The present invention generally relates to a method, apparatus, and computer program for providing sub-content while providing online content. More particularly, the present invention relates to a method, apparatus, and computer program for providing sub-content while providing online content, which provides predetermined sub-content to a user before providing main content or during an interruption in providing the main content, displays a predetermined user interface after a certain period of time, and continuously provides the sub-content only when the user selects the user interface.

2. Description of the Related Art

These days, more people are watching media content including videos using a personal computer (PC) or a mobile terminal such as a smartphone. Accordingly, service providers that provide content including videos are expanding their scope by providing various kinds of content and content covering various subjects.

Many service providers have established a profit system in which a user is allowed to watch content without payment but advertising expenses for an advertisement inserted before the content is charged to an advertiser. However, in order to be offered the desired content, the user should watch the advertisement provided before the content, and a lot of users dislike this situation. Consequently, many techniques for skipping the advertisement inserted before the content are provided. For example, Korean Patent Application Publication 10-2007-0055890 (2007 May 31) discloses a method for skipping a television advertisement.

Similarly, content providers such as YOUTUBE insert a video advertisement before providing content to a user, but relieve the user's displeasure by providing a button for skipping the advertisement after a predetermined time period has passed. FIGS. 1 and 2 each show a display in YOUTUBE, in which an advertisement video is played and a skip button is present on the video before main content is provided.

In YOUTUBE, after an advertisement video is shown for five seconds, a skip button is exposed as shown in FIG. 2. When a user clicks the skip button, play of the advertisement video is stopped and main content is provided to the user. Also, when the user skips the advertisement as mentioned above, billing for the advertisement is not charged to an advertiser. In other words, by excluding the number of viewers not watching the advertisement, accurate billing may be charged to the advertiser.

However, the above mentioned method has inconvenience that the user should click the skip button to stop play of the advertisement video and to be offered the main content. Also, the method involves a negative approach in which a user who does not click the skip button is recognized as a user interested in the advertisement. Additionally, a negative approach has low accuracy compared to a positive approach such as a Click-Through Rate (CTR) approach in which the ratio of clicks is measured as a user personally clicks interesting content in advertisements including a search advertisement or a display advertisement.

Also, a user may not want to be offered sub-content such as an advertisement at the present but may want it to be offered later. However, according to the conventional method, there is no proper method for satisfying this requirement.

Additionally, considering a user's preference such as the user's response to previously provided sub-content, it is desirable to provide sub-content more appropriate for the user rather than providing random sub-content to the user.

Also, when providing various durations of sub-content to a user, if the duration of sub-content is randomly determined not considering the duration or importance of main content, the rate of viewing the sub-content may be lowered, thus causing a fall in advertisement billing rate.

Consequently, a method, apparatus, and computer program for providing sub-content while providing online content, which may reasonably submit an advertisement payment to an advertiser and may solve the inconvenience of a user having to click a skip button, have been continuously required, but a proper solution has not been provided.

SUMMARY OF THE INVENTION

Accordingly, the present invention has been made keeping in mind the above problems occurring in the conventional art, and an object of the present invention is to provide a method, apparatus, and computer program for providing sub-content while providing online content, which may charge reasonable advertisement rates to an advertiser and may solve inconvenience that a user should click a skip button.

Also, the present invention intends to provide a method, apparatus, and computer program for providing sub-content while providing online content, which may provide sub-content to a user at the right time if the user does not want to be offered the sub-content at the present but may want it to be offered later.

Also, the present invention intends to provide a method, apparatus, and computer program for providing sub-content while providing online content, which provide sub-content appropriate for a user rather than providing random sub-content to the user, by considering the user's preference such as the user's response to previously provided sub-content.

Furthermore, the present invention intends to provide a method, apparatus, and computer program for providing sub-content while providing online content, which may determine the duration or kind of sub-content by considering a user's preference or the importance of main content.

According to an aspect of the present invention to accomplish the above objects, a method for providing sub-content while providing online content includes: a sub-content providing step in which a server provides predetermined sub-content to a user's terminal, and the predetermined sub-content is provided to a user before providing main content or provided during an interruption in providing the main content; a user interface displaying step in which a predetermined user interface is displayed on a screen when a predetermined first time period has passed since provision of the sub-content was started; a user selecting step in which the remainder of the sub-content is continuously provided when the user selects the user interface within a predetermined second time period, and in which provision of the sub-content is stopped when the user does not select the user interface within the predetermined second time period; and a main content providing step in which the main content is provided to the user.

A method for providing sub-content while providing online content according to another aspect of the present invention includes: a sub-content providing step in which predetermined sub-content is provided before main content is provided to a user by an user's terminal or during an interruption of the main content provided by the user's terminal; a user interface displaying step in which a predetermined user interface is displayed when a predetermined first time period has passed since provision of the sub-content was started; a user selecting step in which a remainder of the sub-content is continuously provided when the user selects the user interface within a predetermined second time period, and provision of the sub-content is stopped when the user does not select the user interface within the predetermined second time period; and a main content providing step in which the main content is provided to the user.

A computer program according to an embodiment of the present invention is a computer program stored in a computer-readable recording medium, for executing the steps of the method for providing sub-content while providing online content.

An online content providing server for providing main content and sub-content to a user, according to a further aspect of the present invention, comprising: a sub-content providing unit to provide the sub-content to the user before providing the main content or during an interruption in providing the main content, by providing the main content and the sub-content to a user's terminal; a user interface displaying unit to display a predetermined user interface for a predetermined time period; a user selecting unit to continuously provide the sub-content in its entirety when the user selects the user interface, and a main content providing unit to stop provision of the sub-content when the user does not select the user interface; and to provide the main content to the user.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
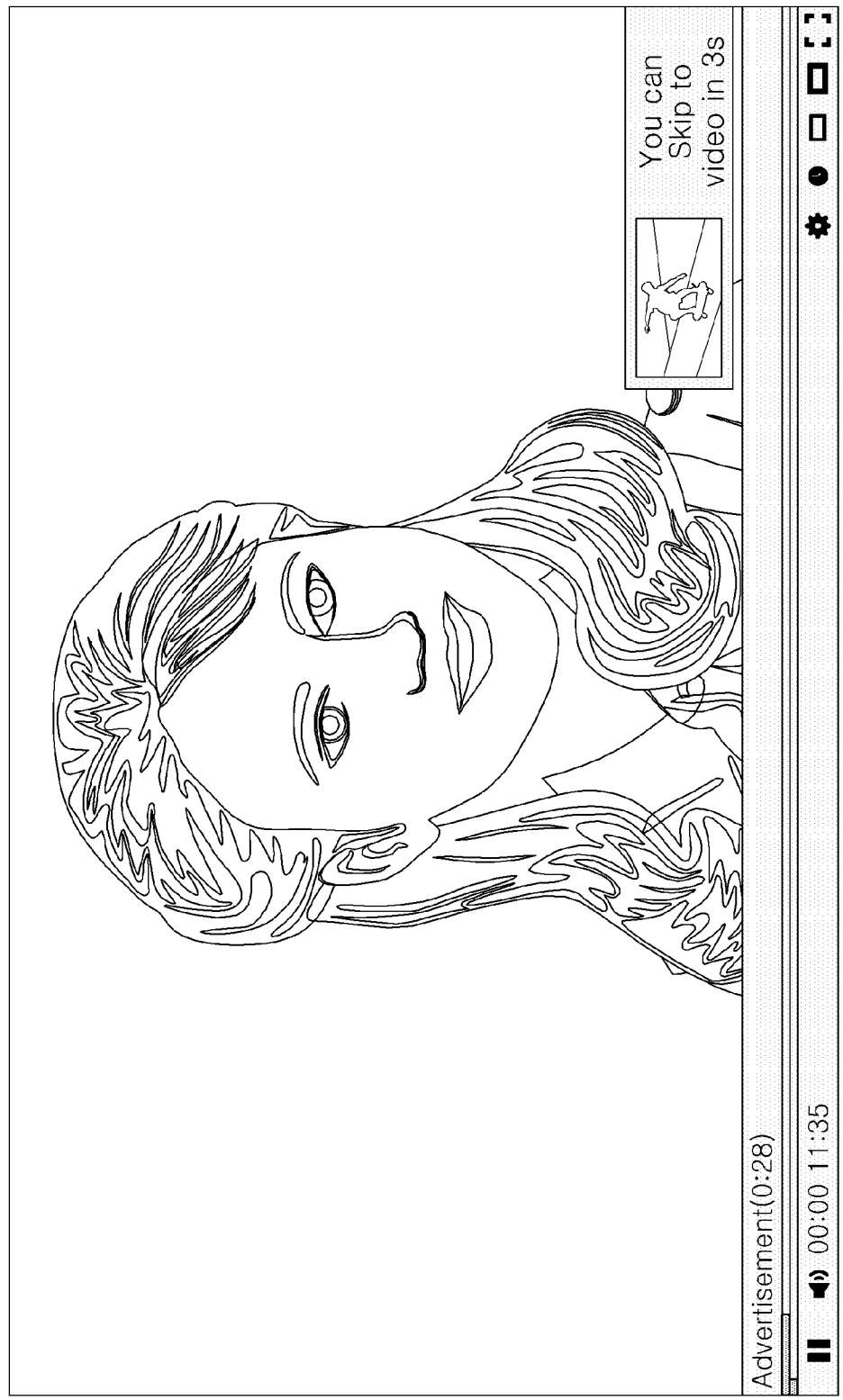
FIG. 1 is an example of a display in which an advertisement video is played before providing main content according to a conventional art.

Specific exemplary embodiments are illustrated in the drawings and described in detail in the specification or application because the embodiments of the present invention may have various forms and modifications.

In describing the present invention, to prevent the present invention from being obscured, details irrelevant to the description are omitted.

Although the terms first, second, etc. may be used herein to describe various elements, these elements should not be limited by these terms. These terms are used to distinguish one element from another.

According to conventional art, in providing advertisement content before providing a user with main content, a button for skipping the advertisement content is provided after a predetermined time period has passed, and play of the advertisement content is stopped and then main content is provided when the user clicks the button. Accordingly, the user experiences the inconvenience of clicking the skip button to be provided with content, and billing is inaccurate because payment is submitted for users who do not click the skip button (negative approach). Consequently, considering the above problems, the present invention provides a method, apparatus, and computer program for providing sub-content while providing online content, which provide predetermined sub-content before providing a user with main content, display a predetermined user interface after a certain period of time, and continuously provide the sub-content only when the user selects the user interface, whereby inconvenience that the user should click a skip button may be solved, and sub-content providers may submit accurate and reasonable payment.

Hereinafter, a method, apparatus, and computer program for providing sub-content while providing online content are described in detail referring to the accompanying drawings.

Figure 3:
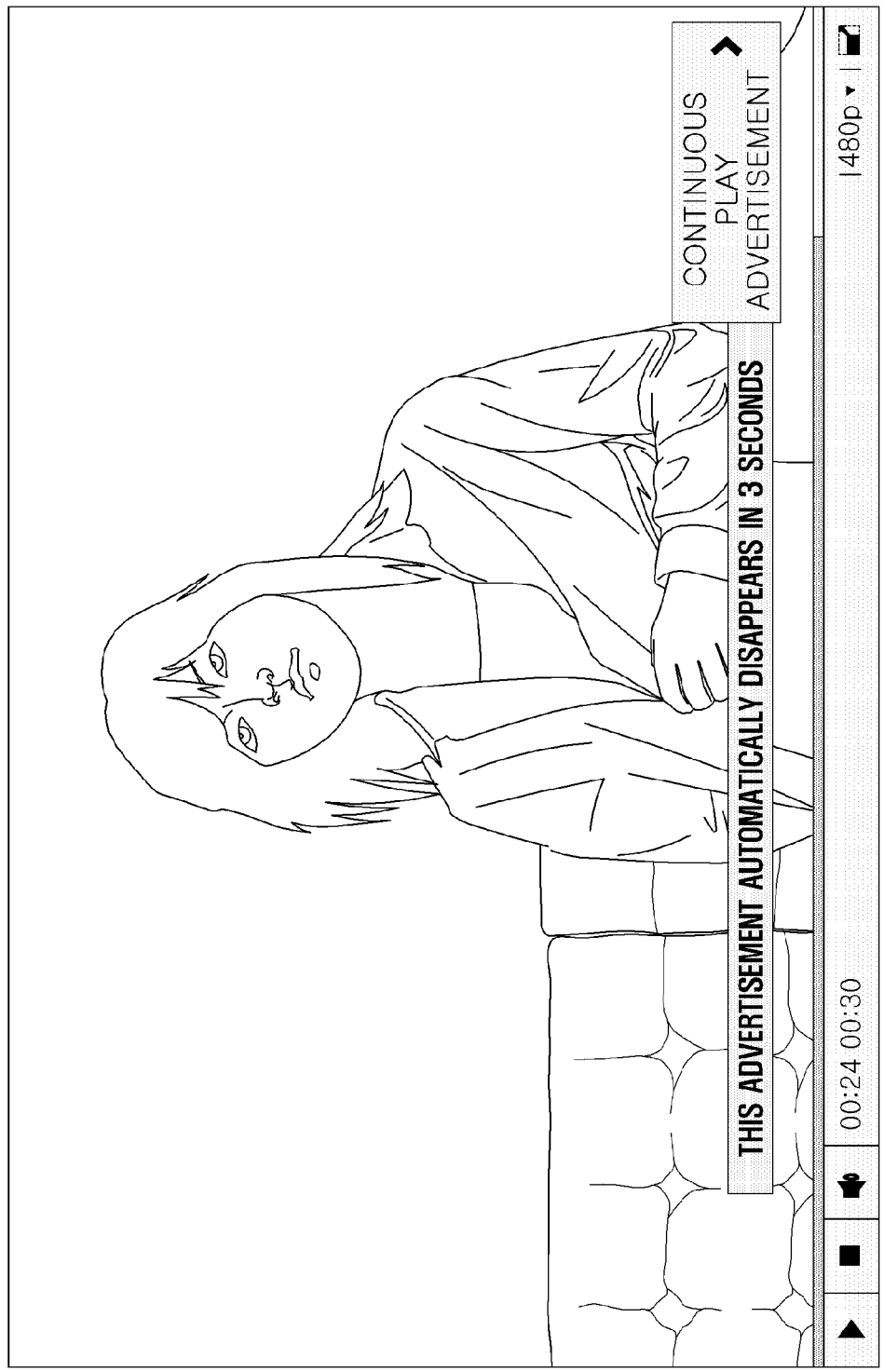
FIG. 3 is an example of a display in which a continuous-play-advertisement button is exposed while an advertisement video is played before providing main content according to an embodiment of the present invention.

First, FIG. 3 illustrates an example of a display in which a continuous-play-advertisement button is exposed while an advertisement video is played before providing main content according to an embodiment of the present invention.

Figure 2:
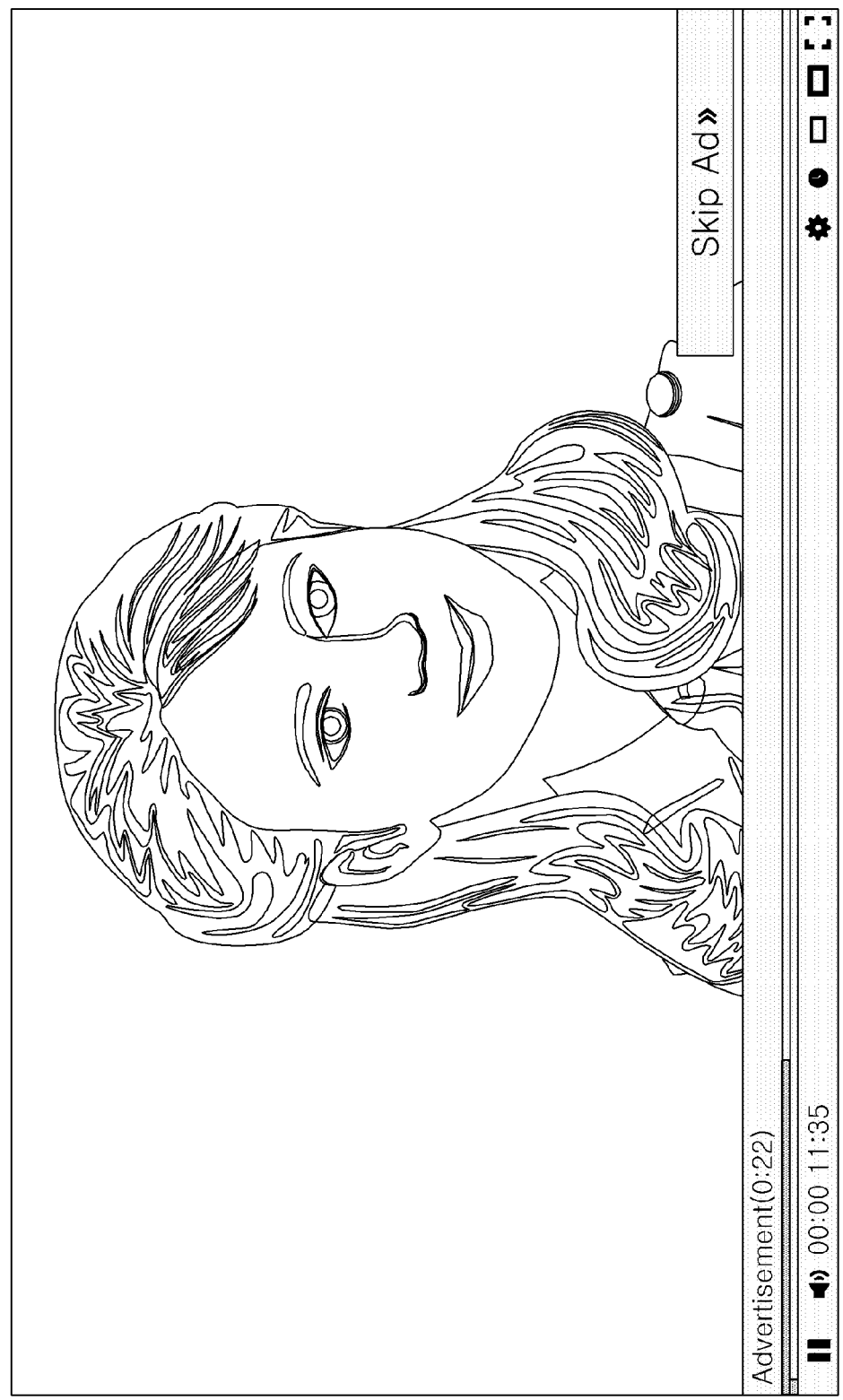
FIG. 2 is an example of a display in which a skip button is exposed while an advertisement video is played before providing main content according to a conventional art.

Comparing FIG. 3 with FIG. 2, FIG. 2 exposes a skip button (more exactly Skip Ad>> button) rather than a continuous-play-advertisement button. Accordingly, in the case of FIG. 2, only when a user clicks the skip button, play of the advertisement video is stopped and provision of main content is started. On the contrary, in the case of FIG. 3, if a user does not click the continuous-play-advertisement button for a predetermined time period, for example, for three seconds as illustrated in FIG. 3, play of the advertisement video is automatically stopped and provision of the main content is started.

However, the present invention is not limited to the situation in which an advertisement video is provided before providing main content, but may be applied to the situation in which an advertisement video is provided during an interval between the time when provision of main content is suspended and the time when the provision of the main content is resumed. Also, the present invention may be applied to various other sub-content besides an advertisement video, such as, for example, a preview of the main content or other content provided before providing main content. Without technical problems, as these various embodiments may be applied by those who skilled in the art, details are omitted.

Figure 4:
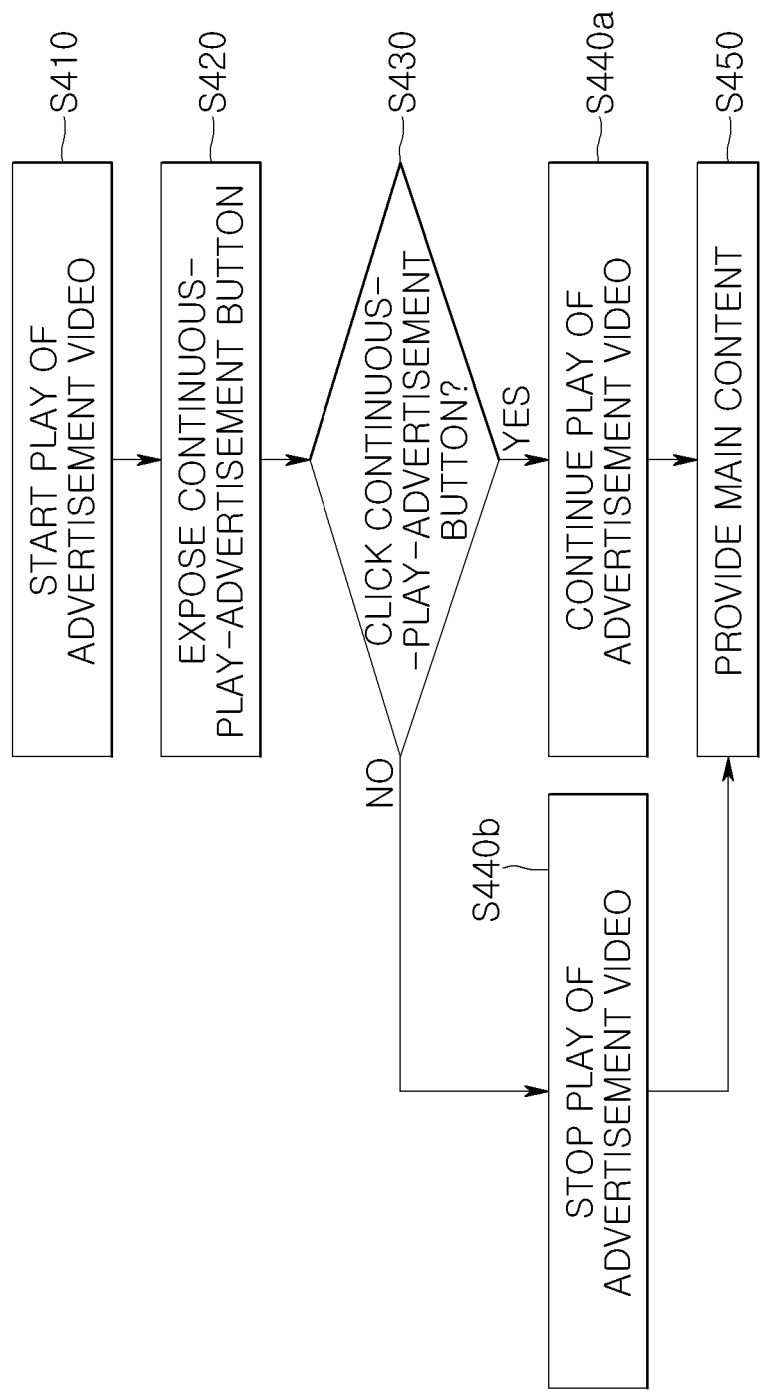
FIG. 4 is a flow diagram of a method for providing sub-content while providing online content according to an embodiment of the present invention.

To specifically examine the operation mechanism of the present invention, a flow diagram of a method for providing sub-content while providing online content is reviewed in FIG. 4. As shown in FIG. 4, a method for providing sub-content while providing online content includes: a step for providing an advertisement video (S410); a step for exposing a continuous-play-advertisement button (S420); a step for determining whether the continuous-play-advertisement button is clicked within a predetermined time period (S430); a step for continuously providing the advertisement video in its entirety when the continuous-play-advertisement button is clicked (S440a); a step for stopping provision of the advertisement video when the continuous-play-advertisement button is not clicked (S440b); and a step for providing a user with main content (S450).

Hereinafter, a method for providing sub-content while providing online content according to an embodiment of the present invention will be described step by step. First, a step for providing a user with an advertisement video (S410) is reviewed. At step S410, an advertisement video is provided to a user. However, the present invention is not limited to an advertisement video, but may be applied to advertisement content without images, such as a voice advertisement, a sound advertisement, and the like. Also, it may be unrestrictedly applied to various kinds of sub-content including content related to main content, such as a preview of the main content.

Generally, the advertisement content is provided on a display of a terminal such as a personal terminal including a personal computer (PC) or a mobile terminal including a smartphone, but a public-use computing device or a public terminal may be used for providing the advertisement content. In other words, any means that can provide a user with advertisement content may be unrestrictedly used. Also, any content transmission method that can transmit advertisement content to a user's terminal, such as streaming, may be used without particular limitation.

Also, when selecting advertisement content to be provided to a user at step S410, it is possible to randomly select one among multiple pieces of advertisement content or to select one by considering a preference of a user watching advertisement content.

Various methods may be used to determine the user's preference. First, there is a method considering the user's response to the previously provided advertisement content. For example, by allowing the user to press a like/dislike button when specific advertisement content is provided, the user's response to the specific advertisement content may be checked and the user's preference may be determined.

Figure 5:
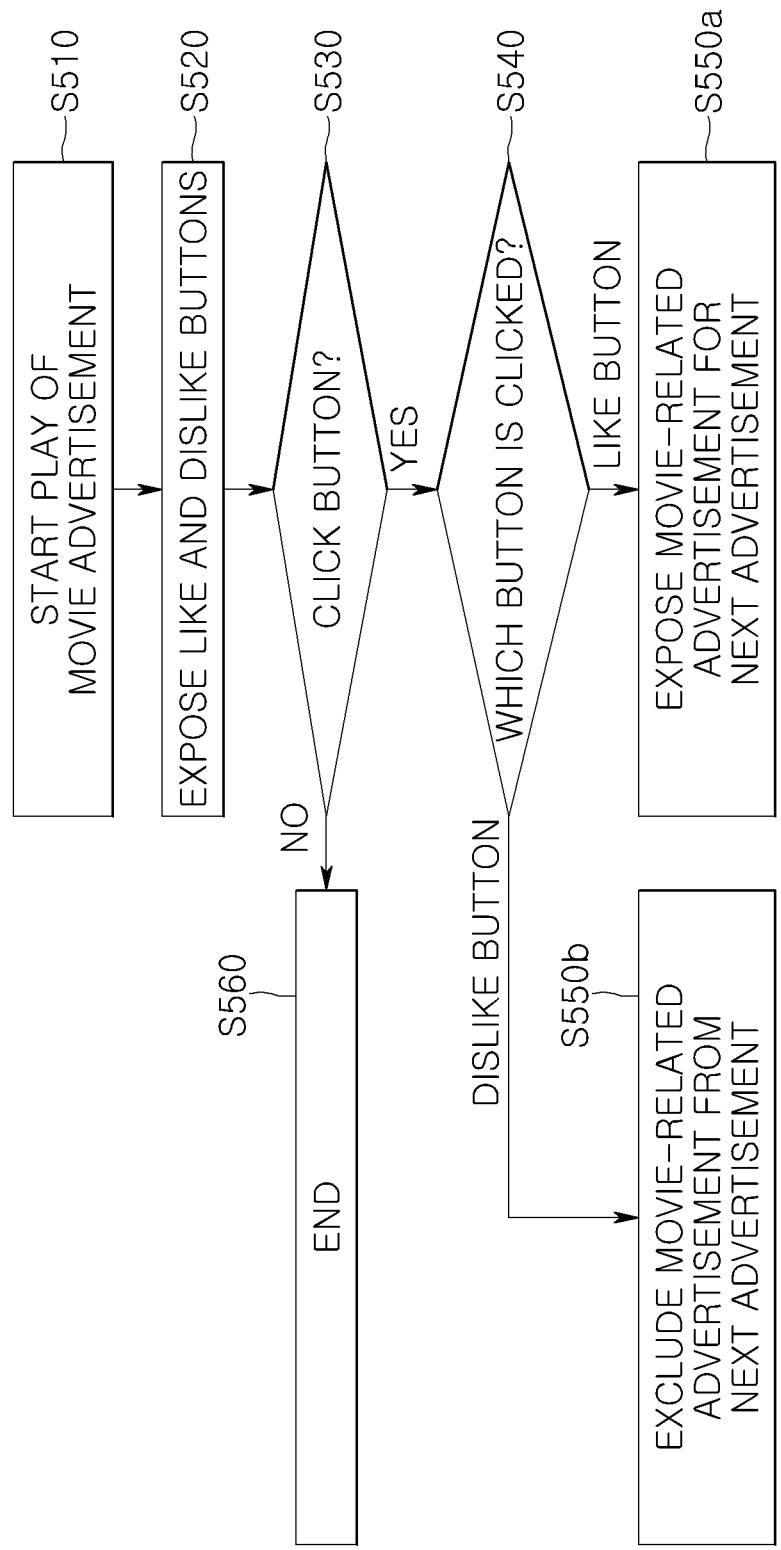
FIG. 5 is a flow diagram of a method for providing sub-content while providing online content according to another embodiment of the present invention.

More specifically, FIG. 5 illustrates a method for determining a user's preference by exposing a like button and a dislike button on a display while providing the user with an advertisement related to a movie, for example, and for reflecting the preference to selection of advertisement content.

First, after providing the user with a predetermined advertisement related to a movie at step S510, a like button and a dislike button that the user can select is exposed at step S520. When the user clicks the button at step S530, it is determined which button is clicked between the like button and the dislike button at step S540. If the user clicks the like button, an advertisement related to a movie is exposed again at step S550a for the next advertisement. If the user clicks the dislike button, an advertisement related to a movie is excluded at step S550b for the next advertisement. Consequently, as an advertisement appropriate for each user is provided, advertising ratings may be raised.

Also, besides a method of exposing the like and dislike buttons as described above, it is possible to determine each user's preference by checking the number of cases in which a user clicks a continuous-play-advertisement button in response to the previously provided advertisement content or the number of cases in which the user does not click the continuous-play-advertisement button.

Next, the step for exposing a continuous-play-advertisement button (S420) is reviewed. After a predetermined time period has passed since the start of an advertisement video, a continuous-play-advertisement button is exposed on the display of a terminal as illustrated in FIG. 3. After the advertisement video has been played for some period of time, the user can understand the content of the advertisement video and may determine whether to watch the remainder of the advertisement video. After a proper time period has passed since the start of the advertisement video, the continuous-play-advertisement button is exposed on the display, and it is determined whether to continue the play of the advertisement video by checking whether the user clicks the continuous-play-advertisement button.

The present embodiment illustrates a case in which a continuous-play-advertisement button is applied, but in addition to the button, various user interfaces may be used depending on the user's environment.

Also, a guidance phrase or an advertisement phrase may be provided to a user with the continuous-play-advertisement button. For example, as shown in FIG. 3, it is possible to provide a guidance phrase such as "This advertisement automatically disappears in 3 seconds", or to provide an additional advertisement phrase related to the advertisement content currently playing.

Figure 6:
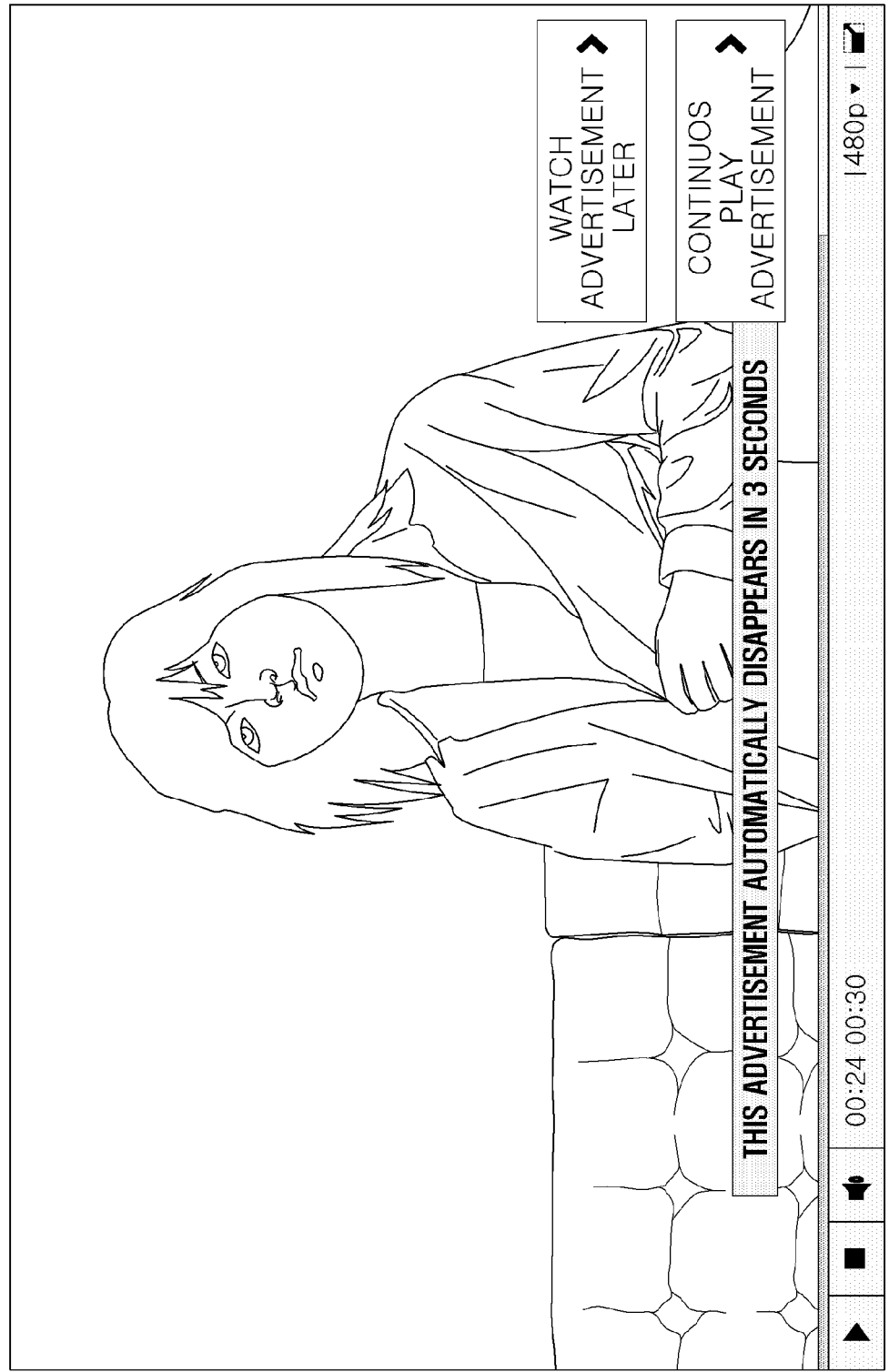
FIG. 6 is an example of a display in which a watch-advertisement-later button is exposed while an advertisement video is played before providing main content according to a further embodiment of the present invention.

Also, a user may want to watch an advertisement video currently playing, but may want to watch the main content before the advertisement video. Accordingly, as shown in FIG. 6, in addition to the continuous-play-advertisement button, it is possible to expose a watch-advertisement-later button of a terminal on the display to allow a user to watch the advertisement later. In this case, when the user clicks the watch-advertisement-later button, provision of the advertisement content is stopped and the main content is immediately provided.

Here, a button is used to allow the user to watch the advertisement later, but besides the button, any user interface that user can select may be applied. Also, it is not necessary to display the watch-advertisement-later button with the continuous-play-advertisement button as shown in FIG. 6. According to the need, the watch-advertisement-later button may be implemented in various forms. For example, the watch-advertisement-later button may be displayed before the continuous-play-advertisement button, a user interface for watching the advertisement later, except for a button type, may be displayed with the continuous-play-advertisement button, or the watch-advertisement-later button may be displayed in an expanded form of the continuous-play-advertisement button.

Furthermore, when a user clicks the watch-advertisement-later button, if the duration of the main content is longer than the predetermined reference duration, the advertisement content is provided during an interruption in of providing the main content, whereas if the duration of the main content is shorter than the predetermined reference duration, the advertisement content may be provided after the main content ends. For example, if the duration of the main content is five minutes or longer, the advertisement content is played during an intermission of the main content, whereas if the duration of the main content is shorter than five minutes, the advertisement content may be played when the main content ends.

Next, the step for determining whether a continuous-play-advertisement button is clicked within a predetermined time period (S430) is reviewed. At step S430, it is determined whether a user has clicked the continuous-play-advertisement button, and whether the advertisement content is continuously provided.

In this case, how long the continuous-play-advertisement button is exposed should be determined. According to conventional art, the button is exposed for a predetermined time period. However, it is not necessary to fix the duration for exposing the continuous-play-advertisement button as the predetermined time period, and the duration may be flexibly determined as necessary. For example, when determining the duration for exposing the continuous-play-advertisement button, the duration of main content or the duration of the advertisement content may be considered.

Figure 7:
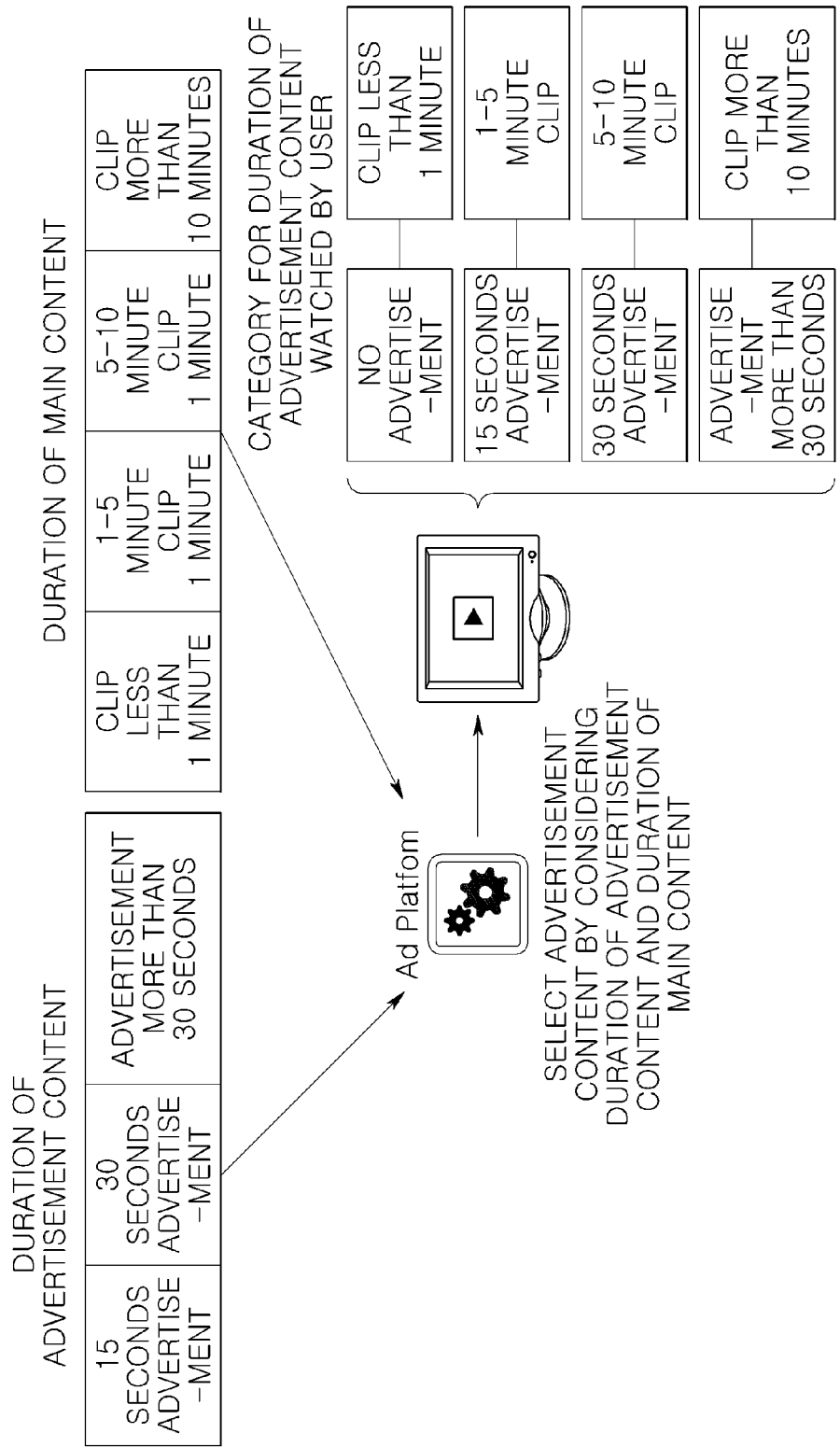
FIG. 7 is a view illustrating a method for determining the duration of an advertisement video before providing main content according to yet another embodiment of the present invention.

For example, similar to the case of FIG. 7, according to the duration of main content, the main content may be classified into clips of which the duration is respectively shorter than one minute, one to five minutes, five to ten minutes, and longer than ten minutes. Also, the advertisement content may be classified into advertisements of which the duration is respectively fifteen seconds, thirty seconds, and longer than thirty seconds. In this case, when the duration of the main content is shorter than one minute, one to five minutes, five to ten minutes, and longer than ten minutes, the duration for exposing the continuous-play-advertisement button may be set as three seconds, five seconds, seven seconds, and eight seconds, respectively. Also, when the duration of the advertisement content is fifteen seconds, thirty seconds, and longer than thirty seconds, the duration for exposing the continuous-play-advertisement button may be set as zero seconds, one second, and two seconds, respectively.

Accordingly, based on the duration of the main content, or based on the duration of the advertisement content, the duration for exposing the continuous-play-advertisement button may be determined. Also, considering both the duration of the main content and the duration of the advertisement content, the duration for exposing the continuous-play-advertisement button may be determined. In other words, the duration for exposing the continuous-play-advertisement button may be obtained by adding the duration based on the duration of the main content and the duration based on the duration of the advertisement content. For example, when the duration of the main content is four minutes and the duration of the advertisement content is thirty seconds, the continuous-play-advertisement button may be exposed for six seconds. The six seconds is obtained by adding five seconds and one second, which are time durations determined according to the duration of the main content and the duration of the advertisement content, respectively.

According to another embodiment of the present invention, the duration of advertisement content to be provided to a user may be determined by considering the duration of the main content. FIG. 7 illustrates a method for determining the duration of advertisement content according to the duration of main content that a user wants to be offered. As shown in FIG. 7, main content may be classified into clips of which the duration is shorter than one minute, one to five minutes, five to ten minutes, and longer than ten minutes, and advertisement content may be classified into advertisements of which the duration is fifteen seconds, thirty seconds, and longer than thirty seconds. In this case, considering the durations of both the main content and the advertisement content, when the duration of the main content is shorter than one minute, the advertisement content is not played. When the duration of the main content is one to five minutes or five to ten minutes, the advertisement of which the duration is fifteen seconds or thirty seconds may be played, respectively. Also, when the duration of the main content is longer than ten minutes, the advertisement of which the duration is longer than thirty seconds may be played.

Generally, when the duration of main content is long, there is high probability that the main content is important to a user. Accordingly, even though the user is required to watch advertisement content of which the duration is somewhat long, the user may accept to watch the advertisement content. Also, when the duration of main content is long and the number of users watching the advertisement content is likely reduced, it is desirable to provide advertisement content of which the Cost-per-view (CPV) is high. According to the above mentioned method, a user who wants to be offered main content of which the duration is shorter than one minute may be provided with the main content without watching the advertisement content.

Furthermore, it is possible to determine the duration of the advertisement content by considering not only the duration of main content but also importance of the main content. For example, for popular content that is watched by many users and that obtains a high rating among multiple pieces of main content, even though somewhat long advertisement content is assigned, a user is likely to accept watching the advertisement content. Also, when a specific user is repeatedly provided with content similar to specific main content, the main content is regarded as important content to the user. Accordingly, the duration of advertisement content may be determined by considering the importance of the content to the user.

Also, a computer program according to a further embodiment of the present invention is a program stored on a computer-readable recording medium, which implements each of the steps of the method for providing sub-content while providing online content, described above. The computer program may be not only a computer program including assembly codes generated by a compiler but also a computer program including high-level language codes executable in a computer using an interpreter. In this case, the computer is not limited to a personal computer (PC) or a laptop, and the computer includes all data processors capable of executing a computer program with a central processing unit (CPU), such as a server, a smartphone, a tablet, a PC, a PDA, a cell phone, and the like. Also, the computer-readable recording medium may include all kinds of recording mediums for storing both programs and data, which are read by a computer system. Examples of the computer-readable recording medium include the following: read-only memory (ROM), random access memory (RAM), compact disk (CD), digital video disk-ROM (DVD-ROM), magnetic tapes, floppy disks, optical data storage, and the like. Also, the computer-readable recording medium may be implemented in a form of carrier waves (for example, transmission through Internet). Also, this recording medium may be distributed in a computer system connected by a network, and codes that computers can read may be stored and executed using a distributed method.

Figure 8:
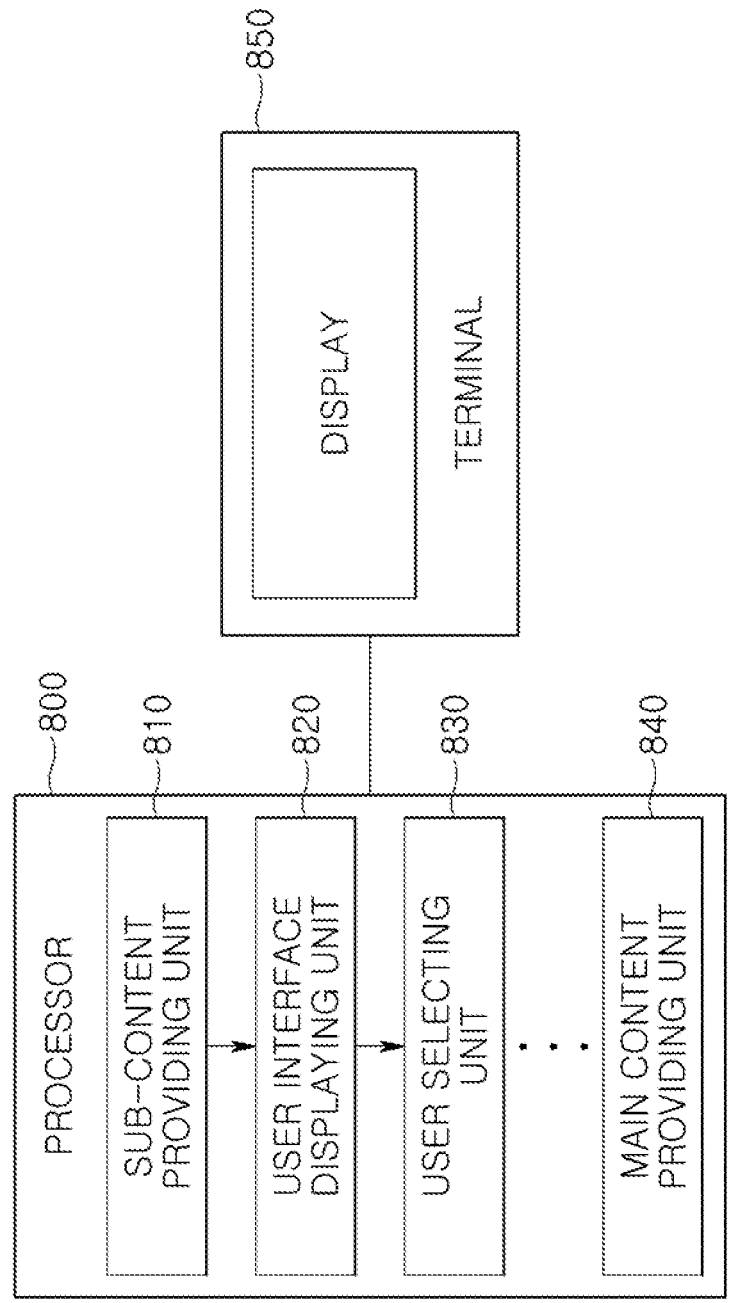
FIG. 8 is an example of a server for providing sub-content while providing online content according to still another embodiment of the present invention.

FIG. 8 illustrates an example of an online content providing server 800 for providing main content and sub-content to a user according to one embodiment of the present invention. As shown in FIG. 8, the online content providing server 800 includes a sub-content providing unit 810 to provide the sub-content to the user before providing the main content or during an interruption in providing the main content, by providing the sub-content to a user's terminal 850; a user interface displaying unit 820 to display a predetermined user interface for a predetermined time period; a user selecting unit 830 to continuously provide the sub-content in its entirety when the user selects the user interface, and to stop provision of the sub-content when the user does not select the user interface; and a main content providing unit 840 to provide the main content to the user.

Figure 9:
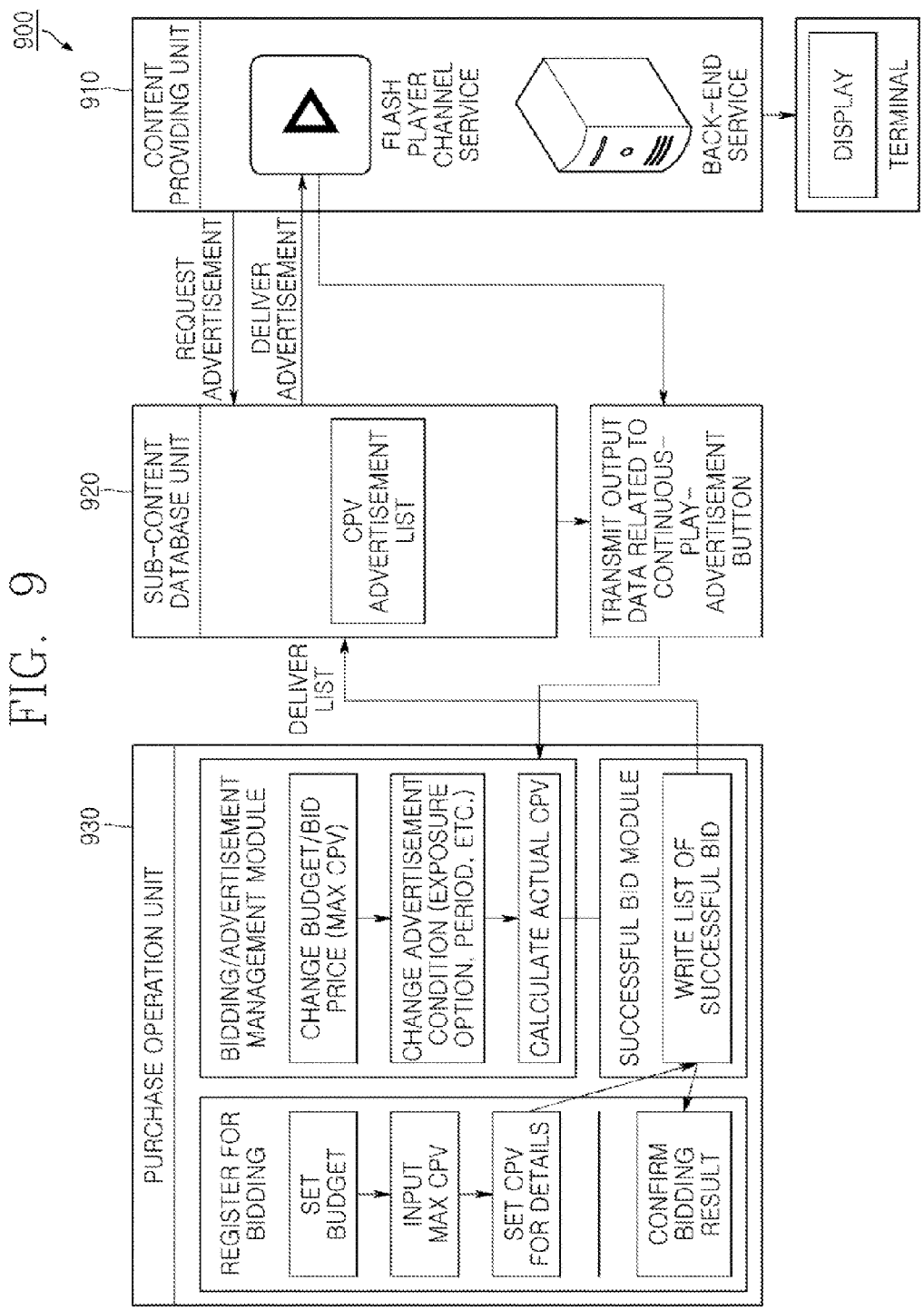
FIG. 9 is an example of a system for providing sub-content while providing online content according to still another embodiment of the present invention.

FIG. 9 illustrates an example of a sub-content providing system 900 for providing online content according to one embodiment of the present invention. As shown in FIG. 9, the sub-content providing system 900 includes a content providing unit 910 for providing a user with main content and sub-content; a sub-content database unit 920 for storing sub-content and for delivering a part or all of the sub-content to the content providing unit 910; and a purchase operation unit 930 for calculating actual billings charged to sub-content bidders. The purchase operation unit 930 calculates the actual billings by the processes of: delivering a list of sub-content to the sub-content database unit 920, the sub-content being provided to the content-providing unit 910; receiving, from the content providing unit 910, a list of sub-content that has been provided to a user and then has been watched in its entirety by the user; and calculating the actual billings charged to a sub-content bidder by considering bid details for each of the sub-content, which is suggested by the sub-content bidder.

The content providing unit 910 provides the sub-content before providing the main content to a user, and displays a predetermined user interface for a predetermined time period. When the user selects the user interface, the content providing unit 910 continuously provides the sub-content in its entirety. When the user does not select the user interface, the content providing unit 910 stops provision of the sub-content and then provides the main content to the user. In this case, based on the bidding details by multiple sub-content bidders, the purchase operation unit 930 determines a list of advertisement content to be provided to the user.

Hereinafter, the sub-content providing system 900 for providing online content according to yet another embodiment of the present invention will be described in detail for each unit. First, the content providing unit 910 is reviewed. The content providing unit 910 provides main content to a user through a media player, including Flash Player and the like. Also, the content providing unit 910 provides sub-content such as a predetermined advertisement before providing the main content or during an intermission of the main content. To provide the sub-content, the content providing unit 910 may send a request for provision of the sub-content such as advertisement to the sub-content database unit 920. Also, the content providing unit 910 delivers the list of sub-content that is watched in its entirety by a user to the purchase operation unit 930, whereby the purchase operation unit 930 calculates actual billings for each advertisement.

Additionally, the content providing unit 910 may be configured to include multiple servers such as a back-end service server for providing a content service to a mobile terminal, and the like.

Next, the sub-content database unit 920 is reviewed. The sub-content database unit 920 stores and manages sub-content such as advertisements, and delivers proper sub-content to the content providing unit 910. According to an embodiment of the present invention, when the sub-content database 920 stores and manages ten pieces of advertisement content, for example, the purchase operation unit 930 may deliver a list of five pieces of advertisement content, selected by a bidding process, to the sub-content database unit 920. Subsequently, when the content providing unit 910 requests provision of advertisement content before providing predetermined main content to a user, the sub-content database unit 920 selects proper advertisement content by considering Cost-per-view (CPV), balance of advertising rates, and the like of the five pieces of sub-content, and delivers the selected advertisement content to the content providing unit 910.

Finally, the purchase operation unit 930 is reviewed. The purchase operation unit 930 determines a list of sub-content that will be provided to users according to a bid result of sub-content bidders such as advertisers, and delivers the list of sub-content to the sub-content database unit 920. Subsequently, the purchase operation unit 930 receives a list of advertisement content that is watched in its entirety by a user, and calculates actual billings charged to sub-content bidders by considering bid details of the sub-content bidders for each of the sub-content.

A process for determining a list of advertisement content to be provided to users through a bidding process by the purchase operation unit 930 is described with the following example. First, suppose, as an example, that a content provider provides users with 1,000 advertisements for a day. Five companies including company A, company B, company C, company D, and company E participate in an advertisement bidding process, and each of the companies wants to expose their advertisements 300 times, 400 times, 300 times, 200 times, and 300 times a day, respectively. Also, Cost-per-view (CPV) of the companies is respectively 300 won, 100 won, 200 won, 200 won, and 100 won, and View-Through-Rate (VTR) of the companies is respectively 0.5%, 0.8%, 0.6%, 0.5%, and 0.7%. Accordingly, bidding scores, which are calculated by multiplying CPV by VTR, of the five companies respectively become 1.5, 0.8, 1.2, 1.0, and 0.7. Consequently, in the order of the bidding score, the five companies may be arranged as company A, company C, company D, company B, and company E. However, as mentioned above, because the total number of advertisements to be provided to the users for a day by the content provider is limited to 1000, company A, company C, and company D may expose their advertisements 300 times, 300 times, and 200 times, respectively, according to the bidding score. Also, company B wants to expose its advertisements 400 times but may expose its advertisements the remaining 200 times. Consequently, advertisement content of company A, company C, company D, and company B (partially successful bid) is provided to users, and the purchasing operation unit 930 delivers the details of the bid of company A, company C, company D, and company B to the sub-content database unit 920. Subsequently, the sub-content database unit 920 provides proper advertisement to the content providing unit 910 according to the details of the bid.

According to an embodiment of the present invention, by the processes of providing predetermined sub-content to a user before providing main content; displaying a predetermined user interface after a certain period of time; and continuously providing the sub-content only when the user selects the user interface, the inconvenience of the user having to take an action such as clicking a skip button may be removed, and a sub-content provider may submit accurate and reasonable payment.

Also, according to another embodiment of the present invention, a user interface is provided to enable a user to watch sub-content later. Accordingly, depending on the user's selection, the user may be provided with interesting sub-content again after being provided with main content, whereby the user's convenience may be improved and the advertisement billing rate may be raised.

Also, according to a further embodiment of the present invention, as sub-content to be provided to a user is determined by considering the user's response to the previously provided sub-content, sub-content useful to the user may be provided and the rate of viewing the advertisement may be raised, whereby an advertisement billing rate may be raised.

Also, according to yet another embodiment of the present invention, as the duration or kind of sub-content is determined by considering a user's preference or the importance of the main content, the rate of viewing an advertisement may be raised so as to raise the advertisement billing rate.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for providing, to a user terminal, online video content including predetermined sub-content and main content, comprising:
   a sub-content providing step in which a server provides the predetermined sub-content to the user terminal and the user terminal displays the sub-content on a screen, wherein the predetermined sub-content is provided to the user terminal before providing main content or provided during an interruption in providing the main content;
   a user interface displaying step in which a predetermined user interface is displayed on the screen of the user terminal along with the sub-content when a predetermined first time period has passed since a start of the display of the sub-content;
   a user selecting step in which a remainder of the sub-content is continuously provided to, and displayed on the screen of, the user terminal when a user selects the user interface within a predetermined second time period, and in which the provision and display of the sub-content is stopped prior to the remainder of the sub-content being provided and displayed when the user does not select the user interface within the predetermined second time period; and
   a main content providing step in which the server provides the main content to the user terminal, and the user terminal displays the main content on the screen after the remainder of the sub-content is provided and displayed or when the sub-content is stopped prior to the remainder of the sub-content being provided and displayed.

2. The method of claim 1, wherein the sub-content is predetermined based on the user's response to the sub-content previously provided to the user.

3. The method of claim 1, wherein the sub-content is advertisement content, or preview content of the main content.

4. The method of claim 1, wherein a predetermined guidance phrase or a predetermined advertisement phrase is provided, together with the user interface, to the user in the user interface displaying step.

5. The method of claim 1, wherein the predetermined second time period is determined by considering a duration of the main content or a duration of the sub-content in the user selecting step.

6. The method of claim 1, further comprising
   displaying a second user interface allowing watching of the sub-content later,
   wherein when the user selects the second user interface, provision of the sub-content is stopped.

7. The method of claim 6, wherein when the user selects the second user interface,
   if duration of the main content is a predetermined reference duration or longer, the sub-content is provided by inserting the sub-content in a middle of providing the main content, and
   if the duration of the main content is shorter than the predetermined reference duration, the sub-content is provided after the provision of the main content is terminated.

8. A method of providing, online video content including predetermined sub-content and main content, comprising:
   a sub-content providing step in which the predetermined sub-content is provided before main content is provided to a user on a display screen by a user's terminal, or during an interruption of the main content provided by the user's terminal;
   a user interface displaying step in which a predetermined user interface is provided on the display screen when a predetermined first time period has passed since a start of the provision of the sub-content;
   a user selecting step in which a remainder of the sub-content is continuously provided to the display when the user selects the user interface on the display screen within a predetermined second time period, and the provision of the sub-content is stopped when the user does not select the user interface on the display screen within the predetermined second time period; and
   a main content providing step in which the main content is provided to the user on the display screen after the remainder of the sub-content is provided or when the sub-content is stopped.

9. A non-transitory computer-readable recording medium storing a program when executed by a processor performs the steps for providing online video content including predetermined sub-content and main content, said steps comprising:
   a sub-content providing step in which the predetermined sub-content is provided before main content is provided to a user on a display screen by a user's terminal or during an interruption of the main content provided by the user's terminal;
   a user interface displaying step in which a predetermined user interface is provided on the display screen when a predetermined first time period has passed since a start of the provision of the sub-content;
   a user selecting step in which a remainder of the sub-content is continuously provided to the display when the user selects the user interface on the display screen within a predetermined second time period, and the provision of the sub-content is stopped when the user does not select the user interface on the display screen within the predetermined second time period; and
   a main content providing step in which the main content is provided to the user on the display screen after the remainder of the sub-content is provided or when the sub-content is stopped.

10. An online content providing server for providing online video content including main content and sub-content to a user, comprising:
- a sub-content providing unit to provide the sub-content to the user before providing the main content or during an interruption in providing the main content, by providing the main content and the sub-content to a user terminal,
- a user interface displaying unit to provide a predetermined user interface to the user terminal for a predetermined time period,
- a user selecting unit to continuously provide the sub-content in its entirety to the user terminal when the user selects the user interface, and to stop provision of the sub-content to the use terminal when the user does not select the user interface, and
- a main content providing unit to provide the main content to the user terminal.

\* \* \* \* \*